United States Patent
Barbu et al.

(10) Patent No.: US 11,770,847 B2
(45) Date of Patent: Sep. 26, 2023

(54) INTERFERENCE MANAGEMENT

(71) Applicant: Nokia Technologies Oy, Espoo (FI)

(72) Inventors: Oana-Elena Barbu, Aalborg (DK);
Benny Vejlgaard, Gistrup (DK); Klaus Ingemann Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 278 days.

(21) Appl. No.: 17/428,716

(22) PCT Filed: Feb. 8, 2019

(86) PCT No.: PCT/EP2019/053104
§ 371 (c)(1),
(2) Date: Aug. 5, 2021

(87) PCT Pub. No.: WO2020/160781
PCT Pub. Date: Aug. 13, 2020

(65) Prior Publication Data
US 2022/0053514 A1 Feb. 17, 2022

(51) Int. Cl.
*H04W 72/542* (2023.01)
*H04B 7/06* (2006.01)
(Continued)

(52) U.S. Cl.
CPC ........ *H04W 72/542* (2023.01); *H04B 7/0617* (2013.01); *H04L 5/0023* (2013.01); *H04L 5/0073* (2013.01); *H04W 24/08* (2013.01)

(58) Field of Classification Search
CPC ... H04W 72/542; H04W 24/08; H04W 24/02; H04W 92/20; H04B 7/0617;
(Continued)

(56) References Cited

U.S. PATENT DOCUMENTS

| 9,986,513 B1* | 5/2018 | Liu ................... H04W 52/283 |
| 2012/0039284 A1* | 2/2012 | Barbieri .............. H04W 48/10 |
| | | 370/329 |

(Continued)

OTHER PUBLICATIONS

3GPP TSG RAN WG1#88, Athens, Greece, Feb. 13-17, 2017, R1-1703110, "Dynamic TDD Interference Mitigation Concepts in NR", Nokia, Alcatel-Lucent Shanghai Bell, 6 pgs.

(Continued)

*Primary Examiner* — Ayaz R Sheikh
*Assistant Examiner* — Tarell A Hampton
(74) *Attorney, Agent, or Firm* — Harrington & Smith

(57) ABSTRACT

According to an example aspect of the present invention, there is provided an apparatus for a base station including at least one processing core, configured to cause the apparatus at least to define a first cluster of time-division duplex user equipments at least partly by including in the first cluster user equipments whose uplink signals may be received using a single first directional beamforming beam, determine a ratio of received signal strengths of a pair of user equipments in the first cluster, the pair including a first user equipment associated with the apparatus and a second user equipment associated with a neighbouring base station device, and responsive to the ratio fulfilling a predetermined condition, inform the neighbouring base station device of a scheduling plan of the first user equipment.

18 Claims, 6 Drawing Sheets

(51) Int. Cl.
*H04L 5/00* (2006.01)
*H04W 24/08* (2009.01)

(58) Field of Classification Search
CPC ... H04L 5/0023; H04L 5/0073; H04L 5/0032; H04L 5/0037; H04L 5/0044; H04L 5/0091; H04L 5/1469; H04J 11/0023; H04J 11/0026
See application file for complete search history.

(56) References Cited

U.S. PATENT DOCUMENTS

| | | | | |
|---|---|---|---|---|
| 2012/0083282 | A1* | 4/2012 | Choi | H04B 7/0617 455/449 |
| 2012/0282934 | A1* | 11/2012 | Simonsson | H04B 7/024 455/446 |
| 2015/0080008 | A1* | 3/2015 | Ngai | H04W 88/06 455/452.2 |
| 2016/0249364 | A1* | 8/2016 | Siomina | H04W 16/32 |
| 2017/0127367 | A1* | 5/2017 | Axnäs | H04W 56/0015 |
| 2018/0323887 | A1* | 11/2018 | Azarian Yazdi | H04W 24/08 |
| 2018/0323916 | A1* | 11/2018 | Yang | H04L 5/0053 |
| 2019/0124598 | A1* | 4/2019 | Fakoorian | H04L 5/0035 |
| 2020/0112420 | A1* | 4/2020 | Xu | H04L 5/0073 |
| 2020/0213052 | A1* | 7/2020 | Li | H04W 72/23 |
| 2020/0389805 | A1* | 12/2020 | Kim | H04W 72/23 |
| 2021/0084655 | A1* | 3/2021 | Estevez | H04W 74/0833 |
| 2021/0204218 | A1* | 7/2021 | Akl | H04W 52/0216 |
| 2021/0274506 | A1* | 9/2021 | Raghavan | H04L 5/0053 |
| 2022/0006501 | A1* | 1/2022 | Kim | H04B 7/0632 |
| 2022/0060265 | A1* | 2/2022 | Xu | H04L 5/0094 |
| 2022/0104057 | A1* | 3/2022 | Abedini | H04W 92/12 |
| 2022/0116129 | A1* | 4/2022 | Ying | H04B 17/345 |
| 2022/0386156 | A1* | 12/2022 | Park | H04W 24/10 |
| 2023/0188229 | A1* | 6/2023 | Xu | H04B 7/088 370/329 |

OTHER PUBLICATIONS

3GPP TSG-RAN WG1 NR AH#2, Qingdao, P.R. China, Jun. 27-30, 2017, R1-1711310, "UL SRS design considerations in a NR", Nokia, Alcatel-Lucent Shanghai Bell, 6 pgs.

3GPP TSG RAN WG1 Meeting NR AH#3, Nagoya, Japan, Sep. 18-21, 2017, R1-1716039, "Interference Measurement Table and Beam Coordination", Samsung, 7 pgs.

3GPP TSG RAN WG1 Ad-Hoc Meeting 1901, Taipei, Taiwan, Jan. 21-25, 2019, R1-1901064, "Network coordination mechanism (s) for CLI", Samsung, 4 pgs.

* cited by examiner

```
┌─────────────────────────────────────────────┐
│ Defining a first cluster of time-division duplex │
│ user equipments at least partly by including in  │
│ the first cluster user equipments whose uplink   │──── 610
│ signals may be received in a base station device │
│ using a single first directional beamforming     │
│ beam                                             │
└─────────────────────────────────────────────┘
                        │
┌─────────────────────────────────────────────┐
│ Determining a ratio of received signal strengths │
│ of a pair of user equipments in the first cluster,│
│ the pair comprising a first user equipment       │──── 620
│ associated with the base station device and a    │
│ second user equipment associated with a          │
│ neighbouring base station device                 │
└─────────────────────────────────────────────┘
                        │
┌─────────────────────────────────────────────┐
│ Responsive to the ratio fulfilling a             │
│ predetermined condition, informing the           │──── 630
│ neighbouring base station device of a            │
│ scheduling plan of the first user equipment      │
└─────────────────────────────────────────────┘
```

FIGURE 6

INTERFERENCE MANAGEMENT

CROSS REFERENCE TO RELATED APPLICATION

This patent application is a U.S. National Stage application of International Patent Application Number PCT/EP2019/053104 filed Feb. 8, 2019, which is hereby incorporated by reference in its entirety.

FIELD

The present disclosure relates to management of cross link interference in cellular communication networks.

BACKGROUND

Cellular wireless communication takes place over wireless links, in cells of a cellular communication network. Uplink and downlink communication, being directed toward a base station and toward a mobile terminal, respectively, may be separated from each other such that these communications do not interfere with each other.

The uplink and the downlink may be separated from each other by placing them at different frequencies, a technique known as frequency division duplexing, FDD. On the other hand the uplink and the downlink may be communicated over the same frequency band, such that interference is avoided. In this case, the frequency band is divided in the time domain, such that it is not used at the same time for uplink and downlink. This technique is known as time division duplex, TDD.

SUMMARY

According to some aspects, there is provided the subject-matter of the independent claims. Some example embodiments are defined in the dependent claims.

According to a first aspect of the present disclosure, there is provided an apparatus for a base station comprising at least one processing core, at least one memory including computer program code, the at least one memory and the computer program code being configured to, with the at least one processing core, cause the apparatus at least to define a first cluster of time-division duplex user equipments at least partly by including in the first cluster user equipments whose uplink signals may be received using a single first directional beamforming beam, determine a ratio of received signal strengths of a pair of user equipments in the first cluster, the pair comprising a first user equipment associated with the apparatus and a second user equipment associated with a neighbouring base station device, and responsive to the ratio fulfilling a predetermined condition, inform the neighbouring base station device of a scheduling plan of the first user equipment.

According to a second aspect of the present disclosure, there is provided a method comprising defining a first cluster of time-division duplex user equipments at least partly by including in the first cluster user equipments whose uplink signals may be received in a base station device using a single first directional beamforming beam, determining a ratio of received signal strengths of a pair of user equipments in the first cluster, the pair comprising a first user equipment associated with the base station device and a second user equipment associated with a neighbouring base station device, and responsive to the ratio fulfilling a predetermined condition, informing the neighbouring base station device of a scheduling plan of the first user equipment.

According to a third aspect of the present disclosure, there is provided an apparatus comprising means for defining a first cluster of time-division duplex user equipments at least partly by including in the first cluster user equipments whose uplink signals may be received in the apparatus using a single first directional beamforming beam, means for determining a ratio of received signal strengths of a pair of user equipments in the first cluster, the pair comprising a first user equipment associated with the base station device and a second user equipment associated with a neighbouring base station device, and means for responsive to the ratio fulfilling a predetermined condition, informing the neighbouring base station device of a scheduling plan of the first user equipment.

According to a fourth aspect of the present disclosure, there is provided a non-transitory computer readable medium having stored thereon a set of computer readable instructions that, when executed by at least one processor, cause an apparatus to at least define a first cluster of time-division duplex user equipments at least partly by including in the first cluster user equipments whose uplink signals may be received using a single first directional beamforming beam, determine a ratio of received signal strengths of a pair of user equipments in the first cluster, the pair comprising a first user equipment associated with the apparatus and a second user equipment associated with a neighbouring base station device, and responsive to the ratio fulfilling a predetermined condition, inform the neighbouring base station device of a scheduling plan of the first user equipment.

According to a fifth aspect of the present disclosure, there is provided a computer program configured to cause at least the following to be performed, when run on a computer, defining a first cluster of time-division duplex user equipments at least partly by including in the first cluster user equipments whose uplink signals may be received in a base station device using a single first directional beamforming beam, determining a ratio of received signal strengths of a pair of user equipments in the first cluster, the pair comprising a first user equipment associated with the base station device and a second user equipment associated with a neighbouring base station device, and responsive to the ratio fulfilling a predetermined condition, informing the neighbouring base station device of a scheduling plan of the first user equipment.

BRIEF DESCRIPTION OF THE DRAWINGS

FIG. 6 is a flow graph of a method in accordance with at least some example embodiments of the present invention.

EMBODIMENTS

A base station may identify clusters of mobiles with potential cross-link interference, each cluster comprising at least two mobiles, each cluster comprising at least one user equipment served by a neighbouring base station. The base station may subsequently inform the neighbouring base station of radio resources it intends to schedule for at least one user equipment in the cluster served by itself, to enable the neighbouring base station to schedule the user equipment (s) in the cluster served by the neighbouring base station with different radio resources, avoiding use of the same radio resources. The clusters may be formed using a beam scanning procedure, as will be described herein below.

Figure 1:
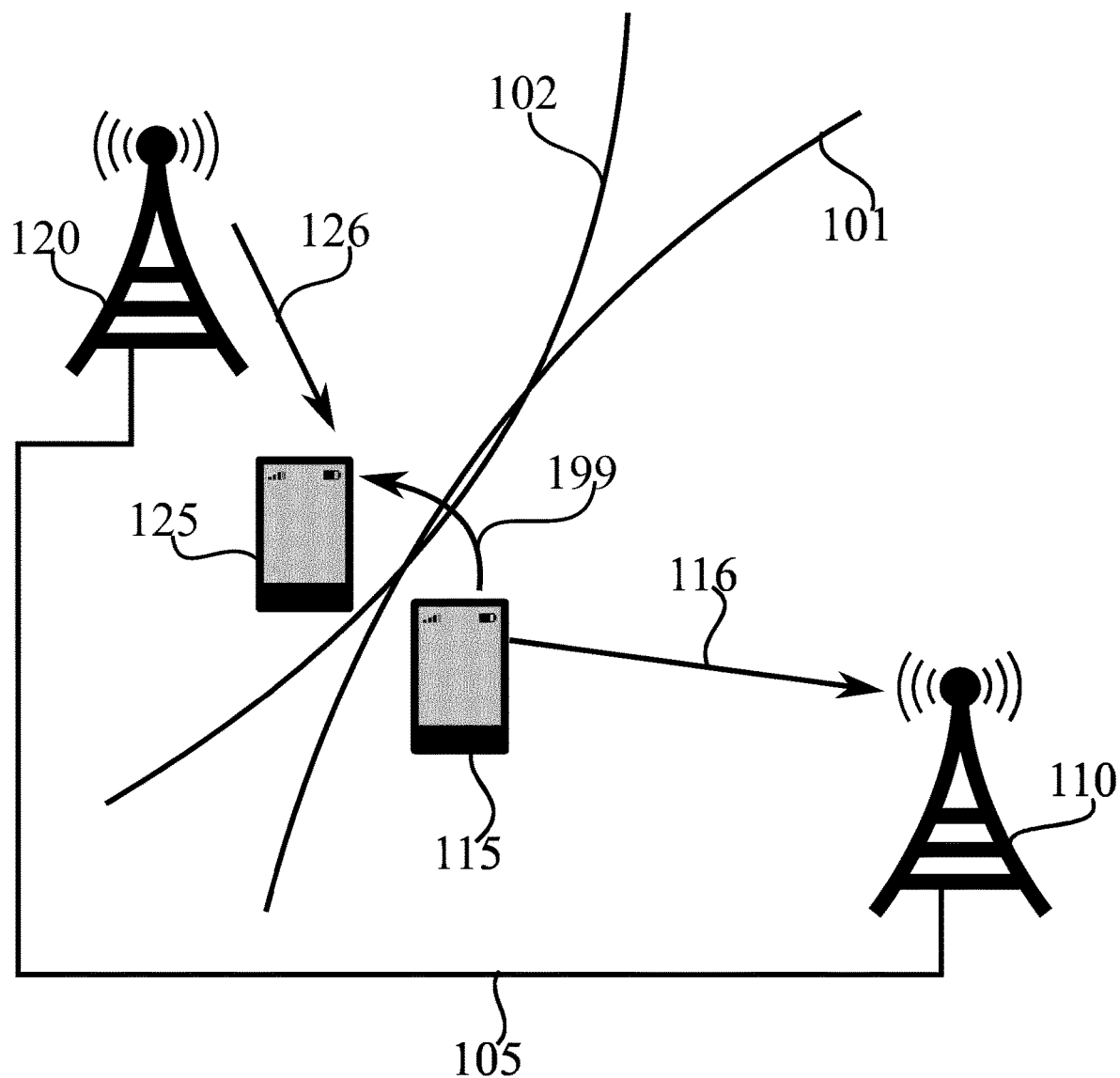
FIG. 1 illustrates an example system in accordance with at least some example embodiments of the present invention.

FIG. 1 illustrates an example system in accordance with at least some example embodiments of the present invention.

The example system comprises base stations 110 and 120, which may each comprise, for example, a fifth generation, 5G, also known as new radio, NR, base station which is sometimes referred to as a gNB in the art. Alternatively, the base stations may be configured to operate in accordance with another kind of cellular communications technology, such as, for example, wireless code division multiple access, WCDMA, for example. The base stations do not strictly need to be of the same type in the sense that one of them may be configured to operate in accordance with a first ratio access technology, RAT, and the other may be configured to operate in accordance with another RAT.

The base stations 110 and 120 are enabled to communicate with each other, either via an inter-base station link 105, or via a radio access network, RAN, control node or core network. Examples of inter-base station links include an X2 interface and an Xn interface, depending on the technology used in the base stations themselves.

In some example embodiments, at least one of the base stations is distributed in the sense that it comprises a centralized unit, CU, and one or more distributed units, DU. An F1 interface may be arranged between the CU and DUs. The DUs may be operated to control cross-link interference in a way that is analogous with the process described herein in detail with reference to two base stations. As such, a neighbouring base station device which is informed of the scheduling plan may be a neighbouring base station, or a neighbouring DU.

A cell edge of a cell controlled by base station 110 is indicated in FIG. 1 schematically as edge 101. Likewise, A cell edge a cell controlled by base station 120 is indicated in FIG. 1 as edge 102. A user equipment, UE, 115 served by base station 110 is disposed near cell edge 101, and likewise a UE 125 served by base station 120 is disposed near cell edge 102. Thus both UEs are in their respective cells, near the cell edge, and also fairly close to each other since the cells are adjacent. A UE served by a particular base station is considered to be associated with that base station. Where cells are small in size, relatively more of the UEs will be located near the edge. 5G technology, for example, may be associated with smaller cells than older cellular technologies.

In the illustrated situation, both UEs 115, 125 have been configured to use TDD, in detail, UE 115 transmits in the uplink 116 at the same time, using the same resources as UE 125 uses to receive in its downlink 126. Since the UEs are close to each other, UE 125 may receive the transmission of UE 115 as cross-link interference 199, which may cause substantial deterioration in communication quality of downlink 126.

In general, there may be two kinds of cross-link interference, firstly where an uplink of one base station is interfered by a downlink of another one, and, secondly, where a downlink of one UE is interfered by an uplink of another UE. The processes disclosed herein are aimed at alleviating the effects of the second type of cross-link interference. This cross-link interference arises at the cell edge, as in more internal parts of a cell, the base station controlling the cell will schedule UEs to avoid resource collisions. Methods to address UE cross-link interference may be divided into methods relying on UEs on the one hand, and base station-driven methods on the other hand. A drawback of UE-driven methods is that UEs need to participate in them by monitoring spectrum and/or sending reference signals to indicate to other UEs that they intend to perform a transmission. Such methods consume UE battery resources and, in some cases, cause some interference in themselves. A base station-driven method is therefore herein preferred.

One way to address the problem of UE cross-link interference, CLI, is CLI management. Methods in this category consist of various kinds of coordination schemes between the neighboring cells. For example, neighboring base stations may schedule their respective users in such a manner to minimize or completely avoid CLI by delaying certain users and prioritizing others, conditioned on their respective loads. As another example, cells may use a hybrid transmission scheme in which the cell center uses a flexible TDD allocation, while the cell edge regions employ only static TDD.

Alternatively, CLI cancellation may be attempted, this group of solutions comprising methods to cancel or suppress the cross-link interference locally at the interfered UE, with the use of advanced detectors such as MMSE-IRC receivers, for example. Disadvantages of such solutions include that these methods require knowledge of the interfering link, and that they incur an increase in signaling overhead and computational complexity.

Figure 2:
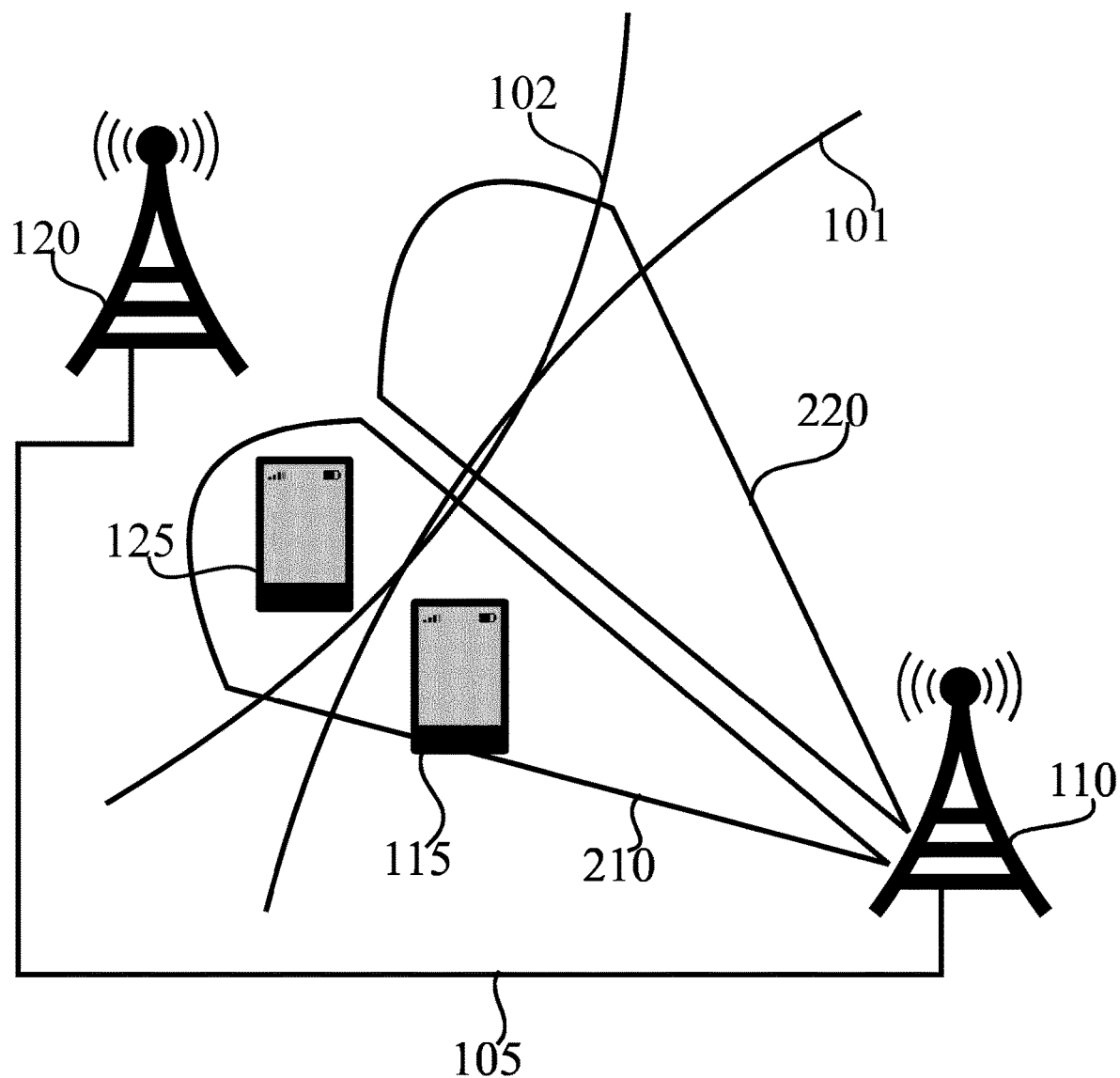
FIG. 2 illustrates an example system in accordance with at least some example embodiments of the present invention.

FIG. 2 illustrates an example system in accordance with at least some example embodiments of the present invention. The system of FIG. 2 is the same one as the one depicted in FIG. 1. Some reference signs have been removed from FIG. 2 to render the figure clearer.

Base station 110 performs a scanning sweep of its cell with beams, namely directional beamforming beams. Using directional beamforming beams for reception of signals is known in the art. Directional beamforming beams, such as beams 210 and 220, cover a directional subset of the cell coverage area, the coverage area of a beam may be considered a sector in the overall cell, as illustrated. The beams may reach into the cell of the neighbouring base station(s) as well, as also illustrated in FIG. 2.

Base station 110 may use plural such beams to assess, if UEs are present as clusters near the cell edge, potentially creating CLI problems. In practice, the base station may listen for uplink transmissions of UEs in each beam by using blind detection or by searching for known uplink patterns, such as sounding reference signals, SRS, transmitted by the UEs. The base station will know the uplink patterns, such as SRS, of UEs it serves, and it may be advised concerning uplink patterns, such as SRS, of UEs served by a neighbouring base station, such as base station 120. Base station 120 may advise base station 110 of an uplink pattern used by UE 125, for example via inter-base station link 105.

In case more than one UE is detectable using a single directional beamforming beam, these UEs are in the same direction from base station 110. UEs in the beam not served by base station 110 are likely near the cell edge of the neighbouring cell. Base station 110 may be configured to measure a received signal power, such as RSRP, of the signals it received from UEs in a specific beam. The UEs thus detectable in a single beam are considered to form a cluster of UEs.

Base station 110 may compute a carrier to interference, C/I, ratio for each pair of UEs in the cluster which involves a UE of a neighbouring cell:

$$\Delta_{(G,B)}(U, j) = RSRP(G, B, U) - RSRP(G, B, j) \quad (1)$$

Here UEs U are the UEs served by base station 110, and UEs j are UEs served by base station 120, or more generally a neighbouring base station. B is an index into a set of beams, and G an index of cells. Therefore $\Delta_{(G,B)}(U, j)$ is the C/I of own user U to foreign user j as seen by beam B of cell G.

A C/I ratio below a predefined threshold is an indicator the UEs involved may be physically close to each other at the cell edge, thus being at risk of cross-link interference. This UE pair, comprising a UE served by base station 110 and a UE served by a neighbouring base station, may be referred to as CLI-prone.

Once one or more CLI-prone UE pair has been identified, base station 110 may inform the neighbouring base station(s) serving the other UEs in this or these pairs concerning resources it plans to use in scheduling its own CLI-prone UE(s) in this or these pairs. This may be referred to as informing the neighbouring base station(s) of a scheduling plan relating to the CLI-prone UE(s). In other words, in terms of FIG. 2, base station 110 may inform base station 120, for example via the inter-base station link 105, of physical resources it plans to allocate to UE 115 in the future. Base station 120, being in receipt of this information, may use it to allocate different physical resources to UE 125, thus avoiding cross-link interference. Examples of physical resources include time slots and physical resource blocks, PRBs. Base station 110 may have UEs in CLI-prone pairs with more than one neighbouring base station, in which case base station 110 may inform each neighbouring base station separately concerning the physical resources it plans to use for the UE which is in a CLI-prone pair with a UE of the respective neighbouring base stations.

Where base station 120 is configured to perform beam sweeps of its cell(s) along similar principles as described above, it may likewise inform base station 110 of physical resources it plans to use in scheduling its CLI-prone UEs. In base station 110 receives such information, it may act on it by avoiding using those resources in scheduling its concerned UEs. In these example embodiments, base station 110 may provide the uplink patterns of its UEs to base station 120, to facilitate the beam sweeping.

The information exchanged between the base stations may comprise, for example, identities of both UEs in the CLI-prone pair and information enabling identifying the physical resources planned for scheduling the UE served by the base station transmitting the information. In some example embodiments, the information could only comprise the identity of the UE served by the base station receiving the information, and the information enabling identifying the physical resources planned for scheduling the UE served by the base station transmitting the information. Thus the message would amount to a request to avoid using the specified resources in scheduling the identified UE.

The beam scanning process may be triggered by various events, including reception of new uplink patterns from a neighbouring base station, indicating the neighbouring base station has begun to serve a new UE. Another example is where the base station itself begins to serve a new UE, a determination, for example based on timing, that a UE served by the base station has moved to a cell edge, or a determination that a UE has moved to another sector, that is, left a current beam of the base station. Base stations may be configured to provide the uplink pattern(s) of UE(s) they begin to serve to neighbouring base stations, to facilitate their beam sweeping processes.

Figure 3:
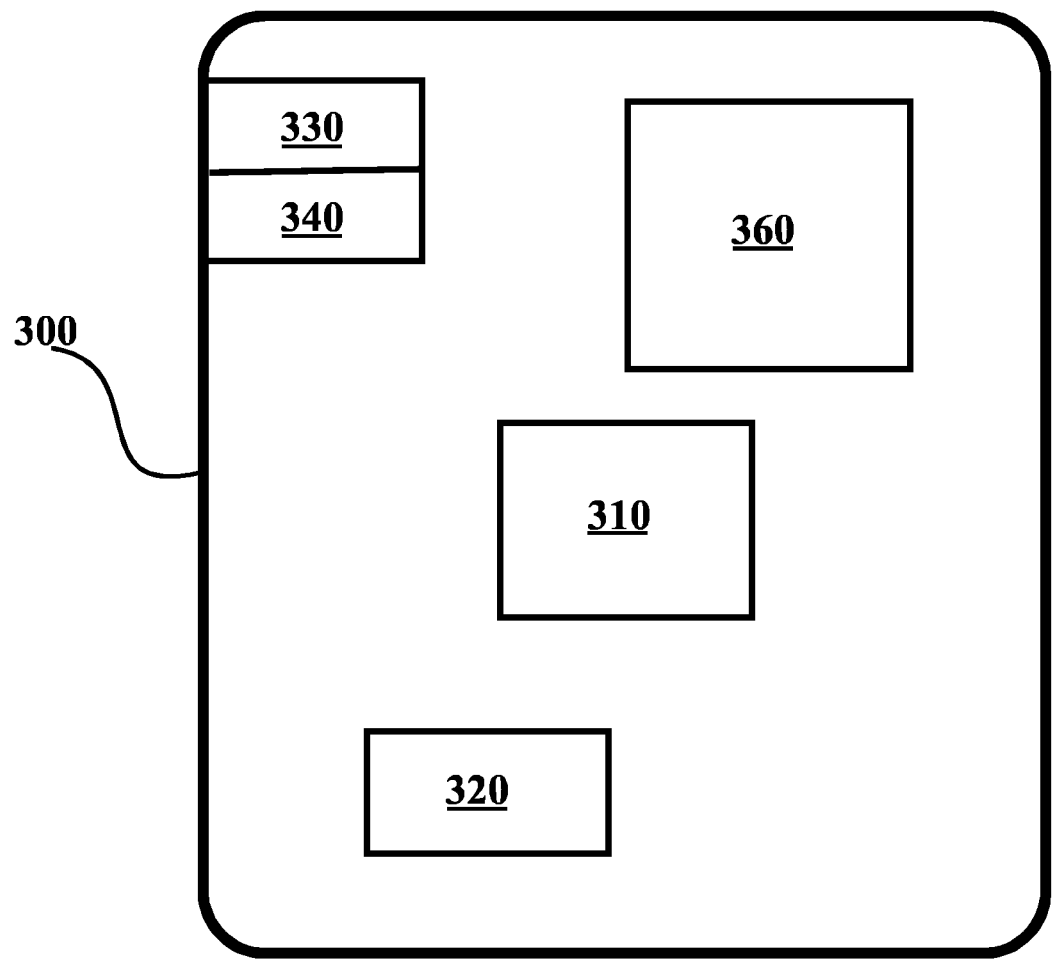
FIG. 3 illustrates an example apparatus capable of supporting at least some example embodiments of the present invention.

FIG. 3 illustrates an example embodiment capable of supporting at least some example embodiments of the present invention. Illustrated is device 300, which may comprise, for example, base station 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Xeon processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure network operations.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the example embodiment various ways of interconnecting at least two of the aforementioned devices may be selected without departing from the scope of the present invention.

Figure 4:
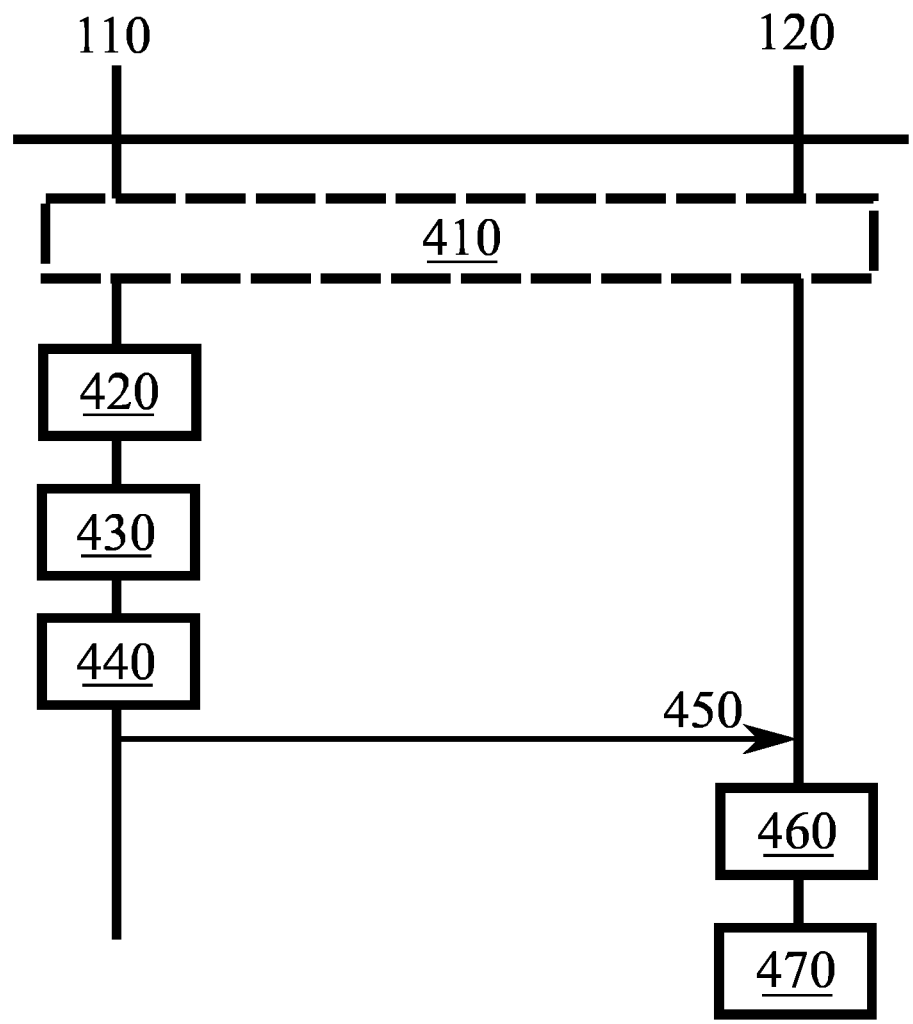
FIG. 4 illustrates signalling in accordance with at least some example embodiments of the present invention.

FIG. 4 illustrates signalling in accordance with at least some example embodiments of the present invention. On the vertical axes are disposed, on the left, base station 110 of FIG. 1 and FIG. 2, and on the right base station 120 of FIG. 1 and FIG. 2. Time advances from the top toward the bottom.

In optional phase 410, uplink patterns of UEs are exchanged between the base stations, or, at least, base station 120 informs base station 110 of uplink patterns of its UEs. Where phase 410 is absent, blind detection of UEs in beams is performed.

In phase 420, base station 110 performs a beam scan of its cell to identify clusters of UEs, as described herein above. In phase 430, the detected clusters are determined and received uplink signal powers are measured. In phase 440, the C/I ratios are calculated for UE pairs, to identify CLI-prone UE pairs from the determined clusters of UEs.

In phase 450, base station 110 informs base station 120 of resources it intends to use in scheduling its UE(s) in at least one CLI-prone UE pair. Responsively, in phase 460 base station 120 identifies its CLI-prone UE(s) based on the information received in phase 450, and in phase 470 CLI management is performed by avoiding use of the resources identified by base station 110 in phase 450, when scheduling the UE(s) served by base station 120 in the CLI-prone UE pair(s).

In one example embodiment, both base stations perform beam scanning operations independently, and exchange their entire cluster information sets with each other. Then the CLI avoidance scheduling is done only for those UE pairs which the base stations both agree are CLI-prone.

Where a base station is a distributed base station, comprising a CU and DUs, the DUs may perform in the roles of base stations as in, for example, FIG. 4. In other words, the DUs would each separately perform the beam scanning and identification of CLI-prone UE pairs, and they would likewise inform each other of the resources planned for scheduling, this informing taking place via the CU, for example. Also here, the DUs may exchange their entire cluster information sets with each other and perform CLI avoidance scheduling only for those UE pairs which the DUs both agree are CLI-prone.

A possible 5G implementation of the process may thus comprise the following. As a first step, gNB1 and gNB2 exchange information of the UEs that they are serving and their corresponding SRS configurations. That could be implemented as a list of UE IDs, such as C-RNTI, and their SRS configurations. Exchange of SRS configurations facilitates gNB measurement on UE SRS transmissions from UEs served by other gNBs without relying on potentially heavy blind sensing procedures. In addition, the gNBs may also exchange a so-called "CLI threshold" that the gNBs use in latter steps to determine if certain sets of UEs are in prone to cause mutual UE-CLI, and therefore to be considered CLI-prone. As a further example embodiment, if the gNBs also are serving users with UL semi-persistent-scheduling, SPS, or configured grant, CG, information of such configurations and corresponding cell IDs could also be exchanged between the gNBs. This would e.g. enable the gNBs to perform UL measurements on DMRS from users in surrounding cells using SPS, that is, with regularly known deterministic UL transmissions. Similarly, gNB that has knowledge of UEs with CG in neighbouring cells can utilize such information for measuring preamble transmissions from such users, and thereby rely on such measurements for constricting the list of CLI-prone UEs. The exchange of the aforementioned information (SRS, SPS, or CG configurations) may be configured to be event triggered, so such information e.g. is exchanged whenever a gNB starts serving a new UE, a new call is initiated, or a UE coming to the gNB as result of a handover. Similarly, when a gNB stops serving a UE that it has earlier informed a neighbouring gNB about, it may inform that this UE is no longer served such that it does not attempt to measure signals from it. As a non-limiting example, the mentioned information exchange between the two gNBs may be included as part of the Served Cell Information NR IE, which is carried by the Xn Setup and NG-RAN Node Configuration Update procedures.

After the initial information exchange between the gNBs to enable performing the required measurements for the invention, the corresponding steps for performing the beam sweeping measurements, populate a table with information characterizing the directional beamforming beam-generated clusters, and forming a CLI matrix with CLI-prone UE IDs and the physical resources the respective gNBs intend to schedule for such UEs. These steps may be performed periodically (e.g. to have up-to-date information accounting also for users that may have moved), or triggered by certain events. As non-limiting examples, such events may include new users starting to be served by the gNBs, users leaving, etc.

In general, each cell starts with a beam selection procedure which generates a codebook of beams. The beam selection should ensure that a sufficient number of beams is available to enable a full cell sweep. There are several aspects worth noting when performing beam selection. First, the base station beamforming vectors should be selected so that their main lobes cover the full angular range of the cell. This ensures that the entire cell area is being scanned. Secondly, the beam width and the beams overlapping factor should be designed in such a way that they enable the discovery of a maximum number of CLI-prone UE pairs. Too narrow a beam may miss CLI-prone pairs, since the interfering UE may fall out of the beam coverage area. A beam that is too wide may, in contrast, detect UE pairs that are not relevant, that is, users may turn out to be too far apart to pose real CLI problems onto each other. For example, where h is a practical range of CLI in a cell or area, which may be experimentally determined, for example, the beamforming beam width may be set to being less than, or about the same as, h at a cell edge.

For each beam, the base station may then compute the RSRP of the detected UEs and populates a lookup table with the results. The base station may then compute (on a per UE cluster basis) the C/I ratios between its own users and the foreign ones in that cluster, and compare them with its preferred CLI threshold. The threshold defines the "close-proximity" of a user, that is, if the C/I is below the threshold, it means that the two users are closely spaced and therefore UE-CLI may occur, that is, the UEs are CLI-prone. For the ratios that fall below the threshold, the base station may tag these UE pairs as CLI-prone and populate a CLI matrix with their IDs and with the physical resources it intends to use to initiate DL and UL to its own users. The base station may then report the CLI matrix to its neighbour base stations through Xn interface, for example. The neighbour base station can then proceed to perform interference management according to its own preferred procedure. Inter-base station signalling of the CLI matrix may be included in the Served Cell Information NR IE, which is carried by the Xn Setup and NG-RAN Node Configuration Update procedures. Alternatively, it may be included in a load information procedure.

The CLI matrix information could be expressed, for example, in the following format: Firstly, a list of UE IDs (e.g. C-RNTIs) that the gNB sending the CLI matrix is currently serving and which are subject to CLI with UEs served by the gNB that is receiving the CLI matrix. Secondly, for each of the UEs, the anticipated physical resources where it will most likely be scheduled for UL and DL is given, as well as a list of UE IDs from the receiving base station cells that are subject to potential UE-CLI with it.

Figure 5:
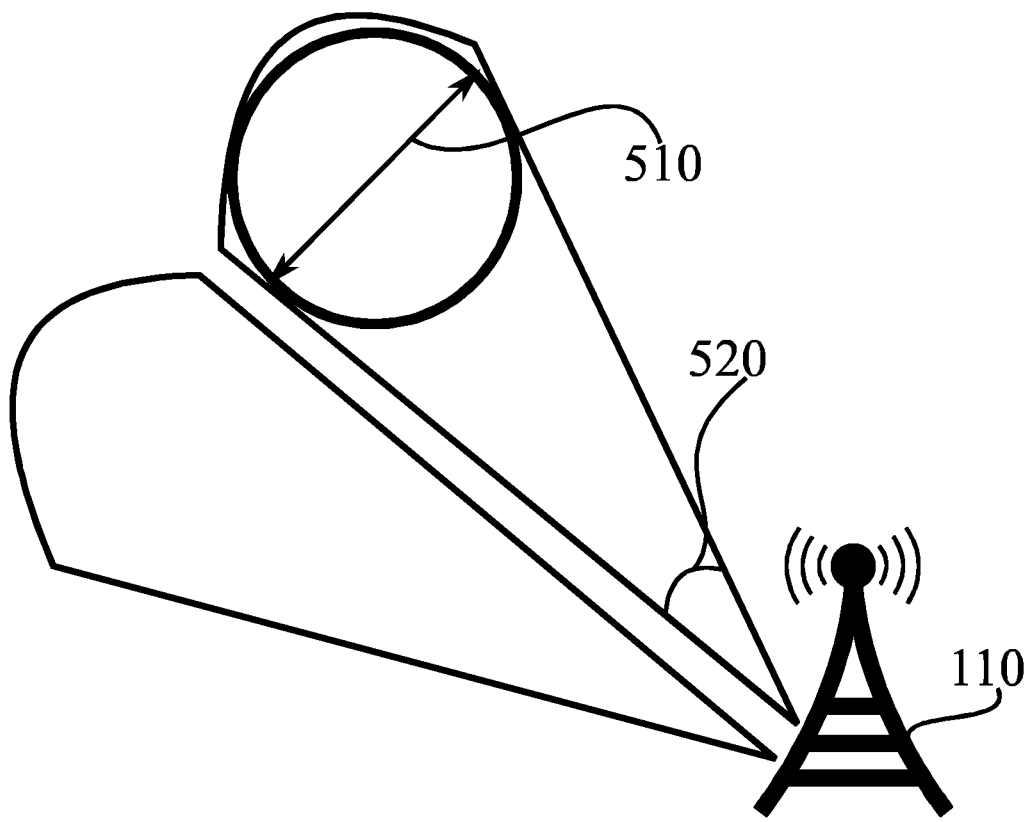
FIG. 5 illustrates an example system in accordance with at least some example embodiments of the present invention.

FIG. 5 illustrates an example system in accordance with at least some example embodiments of the present invention. FIG. 5 aims to illustrate selection of a suitable beam width for the scanning process. Firstly, the base station beamforming vectors should be selected so that their main lobes cover the full angular range. This ensures that the entire cell area will be scanned. Secondly, the beam width and the beams overlapping factor should be designed in such a way that they enable the discovery of a maximum number of UE-CLI pairs. A too narrow beam may miss many CLI pairs, since the interfering UE may fall out of the beam coverage area. A beam that is too wide may, in contrast, detect UE-CLI pairs that are not relevant, that is, users may turn out to be too far apart to pose CLI problems onto each other.

FIG. 5 illustrates an example of how to potentially overcome this problem. To that end, we define the sphere centered at the UE location with diameter 510, for which the measured CLI level on the sphere surface is higher than or equal to a predefined threshold, that is, $CLI_h \geq CLI_{threshold}$. At the base station, the problem comes down to dimensioning the null-to-null beam width, NNBW, 520. Choosing NNBW so that its chord length equals the diameter 510 of the CLI sphere should protect against an over/under-dimensioning of the beams. Alternatively, plural narrow beams could be used, with UEs in neighboring beams being considered to form clusters. In general, the clusters may be generated based on the beams, using either narrow beams or beams dimensioned according e.g. to FIG. 5.

FIG. 6 is a flow graph of a method in accordance with at least some example embodiments of the present invention. The phases of the illustrated method may be performed in base station 110, an auxiliary device such as a DU, or a personal computer, for example, or in a control device configured to control the functioning thereof, when installed therein.

Phase 610 comprises defining a first cluster of time-division duplex user equipments at least partly by including in the first cluster user equipments whose uplink signals may be received in a base station device using a single first directional beamforming beam. Phase 620 comprises determining a ratio of received signal strengths of a pair of user equipments in the first cluster, the pair comprising a first user equipment associated with the base station device and a second user equipment associated with a neighbouring base station device. Finally, phase 630 comprises, responsive to the ratio fulfilling a predetermined condition, informing the neighbouring base station device of a scheduling plan of the first user equipment.

It is to be understood that the example embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one embodiment or an example embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and example of the present invention may be referred to herein along with alternatives for the various components thereof. It is understood that such example embodiments, examples, and alternatives are not to be construed as de facto equivalents of one another, but are to be considered as separate and autonomous representations of the present invention.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some of the example embodiments of the present invention find industrial application in interference management.

ACRONYMS LIST

C/I carrier to interference
IRC interference rejection combining
MMSE minimum mean square error
RSRP reference signal received power

REFERENCE SIGNS LIST

| 110, 120 | base station |
|---|---|
| 101, 102 | cell edge |
| 105 | inter-base station link |
| 115, 125 | user equipment |
| 116 | uplink |
| 125 | downlink |
| 199 | cross-link interference |
| 210, 220 | beams |
| 300-360 | structure of the device of FIG. 3 |
| 410-470 | phases of the method of FIG. 4 |
| 510 | diameter of CLI sphere |
| 520 | beam width |
| 610-630 | phases of the method of FIG. 6 |

The invention claimed is:

1. An apparatus for a base station comprising:
at least one processing core; and
at least one non-transitory memory including computer program code, the at least one memory and the computer program code being configured to, with the at least one processing core, cause the apparatus at least to:
define a first cluster of time-division duplex user equipments at least partly by including in the first cluster user equipments whose uplink signals configured to be received using a single first directional beamforming beam;
determine a ratio of received signal strengths of a pair of user equipments in the first cluster, the pair comprising a first user equipment associated with the apparatus and a second user equipment associated with a neighbouring base station device;
responsive to the ratio fulfilling a predetermined condition, inform the neighbouring base station device of a scheduling plan of the first user equipment; and
select a beamforming beam width for cluster definition based at least in part on a defined cross link interference range in a cell coverage area of a cell controlled by the apparatus,
wherein the apparatus is further configured to include in the first cluster at least one further user equipment, whose uplink signal are configured to be received using a single directional beamforming beam adjacent to the first directional beamforming beam, the beamforming beam width being less than the cross link interference range at a cell edge.

2. The apparatus according to claim 1, wherein the apparatus is configured to define a second cluster of time-division duplex user equipments by determining that uplink signals from the user equipments of the second cluster are configured to be received using a single second directional beamforming beam, to determine a second ratio of received signal strengths of a second pair of user equipments in the second cluster, the second pair comprising a third user equipment associated with the apparatus and a fourth user equipment associated with a second neighbouring base station device, and to inform, responsive to the second ratio fulfilling a predetermined condition, the second neighbouring base station device of a scheduling plan of the third user equipment.

3. The apparatus according to claim 1, wherein the apparatus is configured to receive, from the neighbouring base station device, information facilitating the reception of the uplink signals from the second user equipment.

4. The apparatus according to claim 1, wherein the apparatus is configured to send, to the neighbouring base station device, information facilitating the reception of uplink signals from the first user equipment.

5. The apparatus according to claim 3, wherein the apparatus is configured to send the information facilitating the reception of uplink signals from the first user equipment as a response to the first user equipment associating with the apparatus.

6. The apparatus according to claim 3, wherein the information facilitating the reception of the uplink signals from the first and/or second user equipment comprises at least one of: a user equipment identity or a sounding reference signal configuration.

7. The apparatus according to claim 1, wherein the apparatus is configured to receive, from the neighbouring base station device, a scheduling plan of the second user equipment, and to avoid using in scheduling of the first user equipment physical resources which collide with the scheduling plan of the second user equipment.

8. The apparatus according to claim 1, wherein the apparatus is configured to search for user equipment uplink signals, using a directional beamforming beam sweep, either periodically or responsive to an event.

9. The apparatus according to claim 8, wherein the event comprises at least one of the following:
a new user equipment associating with the apparatus,
a user equipment de-association with the apparatus, or
reception of information indicating a new user equipment associating with the neighbouring base station device.

10. A method comprising:
defining a first cluster of time-division duplex user equipments at least partly by including in the first cluster user equipments whose uplink signals are configured to be received in a base station device using a single first directional beamforming beam;
determining a ratio of received signal strengths of a pair of user equipments in the first cluster, the pair comprising a first user equipment associated with the base station device and a second user equipment associated with a neighbouring base station device;
responsive to the ratio fulfilling a predetermined condition, informing the neighbouring base station device of a scheduling plan of the first user equipment;
selecting a beamforming beam width for cluster definition based at least in part on a defined cross link interference range in a cell coverage area of a cell controlled by the base station device;
include in the first cluster at least one further user equipment, whose uplink signal are configured to be received using a single directional beamforming beam adjacent to the first directional beamforming beam, the beamforming beam width being less than the cross link interference range at a cell edge; and
searching for user equipment uplink signals, using a directional beamforming beam sweep, either periodically or responsive to an event.

11. The method according to claim 10, further comprising defining a second cluster of time-division duplex user equipments by including in the second cluster user equipments whose uplink signals are configured to be received in the base station device using a single second directional beamforming beam, determining a second ratio of received signal strengths of a second pair of user equipments in the second cluster, the second pair comprising a third user equipment associated with the apparatus and a fourth user equipment associated with a second neighbouring base station device, and informing, responsive to the second ratio fulfilling a predetermined condition, the second neighbouring base station device of a scheduling plan of the third user equipment.

12. The method according to claim 10, wherein the apparatus is configured to receive, from the neighbouring base station device, information facilitating the reception of the uplink signals from the second user equipment.

13. The method according to claim 10, further comprising sending, to the neighbouring base station device, information facilitating the reception of uplink signals from the first user equipment.

14. The method according to claim 12, comprising sending the information facilitating the reception of uplink signals from the first user equipment as a response to the first user equipment associating with the apparatus.

15. The method according to claim 12, wherein the information facilitating the reception of the uplink signals from the first and/or second user equipment comprises at least one of: a user equipment identity or a sounding reference signal configuration.

16. The method according to claim 10, further comprising receiving, from the neighbouring base station device, a scheduling plan of the second user equipment, and avoiding using in scheduling of the first user equipment physical resources which collide with the scheduling plan of the second user equipment.

17. The method according to claim 10, wherein the event comprises at least one of the following:
a new user equipment associating with the apparatus,
a user equipment de-association with the apparatus, or
reception of information indicating a new user equipment associating with the neighbouring base station device.

18. A non-transitory program storage device readable by a machine, tangibly embodying a program of instructions executable by the machine for performing operations, the operations comprising the method as claimed in claim 10.

* * * * *